US006889469B1

(12) United States Patent
Chung

(10) Patent No.: US 6,889,469 B1
(45) Date of Patent: May 10, 2005

(54) MULTI PURPOSE FISH-HOOK CASE INCLUDING FISHLINE BINDING DEVICE

(76) Inventor: Kwang-Suk Chung, 1482-4, Sa-dong, Ansan-City, Kyonggi-do 425-170 (KR)

( * ) Notice: Subject to any disclaimer, the term of this patent is extended or adjusted under 35 U.S.C. 154(b) by 0 days.

(21) Appl. No.: 09/958,193

(22) PCT Filed: Apr. 3, 2000

(86) PCT No.: PCT/KR00/00302

§ 371 (c)(1),
(2), (4) Date: Feb. 21, 2002

(87) PCT Pub. No.: WO00/59298

PCT Pub. Date: Oct. 12, 2000

(30) Foreign Application Priority Data

| | | |
|---|---|---|
| Apr. 2, 1999 | (JP) | 11-002122 |
| Jan. 18, 2000 | (KR) | 2000-1341 |
| Feb. 12, 2000 | (KR) | 2000-6704 |

(51) Int. Cl.[7] .......... A01K 97/06
(52) U.S. Cl. .......... 43/57.1
(58) Field of Search .......... 43/54.1, 57.1; 206/315.11

(56) References Cited

U.S. PATENT DOCUMENTS

| | | | | |
|---|---|---|---|---|
| 3,197,915 A | * | 8/1965 | Staver | 43/57.1 |
| 3,346,313 A | * | 10/1967 | Fee | 43/57.1 |
| 3,490,169 A | * | 1/1970 | Tweed | 43/57.1 |
| 3,639,021 A | * | 2/1972 | Fee | 312/234.1 |
| 4,198,777 A | * | 4/1980 | Cruzan et al. | 43/57.1 |

(Continued)

*Primary Examiner*—Kurt Rowan
(74) *Attorney, Agent, or Firm*—Nowrocki, Rooney & Sivertson, P.A.

(57) ABSTRACT

A multi purpose fish-hook case with fishline binding device is disclosed. The fish-hook case (1), used for keeping a variety of fish-hook therein, of this invention consists of a main body (10) provided with a lid (15). This lid (15) is designed to be elastically opened around its hinged portion due to a spring force through a one-touch opening process when a user presses down a first actuation button (11) provided at a predetermined position of the lid's central portion. This lid (11) also has a window (16) at a predetermined position, thus allowing the user to see the contents of the case (1). A steel plate (23) is fixed to a predetermined position at one side within the main body (10) of the case (1). At least one fish-hook container **(20, 20*a*) is magnetically and removably attached to the steel plate (23) due to its bottom magnet (22) and designed to regularly and inclinedly receive a variety of fish-hooks therein. An accessory case (30) is fixed to the other side within the main body (10) of the fish-hook case (1), with a cover (33) hinged to the accessory case (30) by a hinge (35) and elastically opened by a spring (36) when the user operates a second button (34). The accessory case (30) has a plurality of cells (32) separately receiving a variety of fishing accessories therein. A fishline binding device receiving cell is formed at a predetermined portion within the main body (10), with a fishline binding device (19)** used for tying a desired fishline to a desired fish-hook and received within the fishline binding device receiving cell. The multi purpose fish-hook case of this invention thus allows a user to more easily, rapidly and simply tie a fishline to a fish-hook and to easily and simply keep such fish-hooks with the fishlines within the fish-hook container. The multi purpose fish-hook case of this invention also has a means for measuring the length and weight of the fish. This fish-hook case may be also provided with a radio, a flashlight and/or a gas lighter.

10 Claims, 15 Drawing Sheets

U.S. PATENT DOCUMENTS 4,936,044 A * 6/1990 Bruce ........................ 43/57.1
5,305,544 A * 4/1994 Testa ........................ 43/54.1
5,410,836 A * 5/1995 Hardy ........................ 43/57.1
5,471,779 A * 12/1995 Downey ..................... 43/54.1
5,636,469 A * 6/1997 Pizzolo ...................... 43/54.1
5,704,158 A * 1/1998 Whiteaker .................. 43/57.1
5,864,981 A * 2/1999 Zeman ...................... 43/54.1
5,938,023 A * 8/1999 Herron .................. 206/315.11
5,950,352 A * 9/1999 Volmer ...................... 43/57.1
6,185,860 B1 * 2/2001 Thibodeaux ............... 43/54.1
6,193,062 B1 * 2/2001 Rysgaard et al. ...... 206/315.11
6,385,897 B1 * 5/2002 Klabunde .................. 43/54.1
6,427,377 B1 * 8/2002 Kim .......................... 43/54.1
6,516,555 B2 * 2/2003 Buzzell ..................... 43/57.1

* cited by examiner

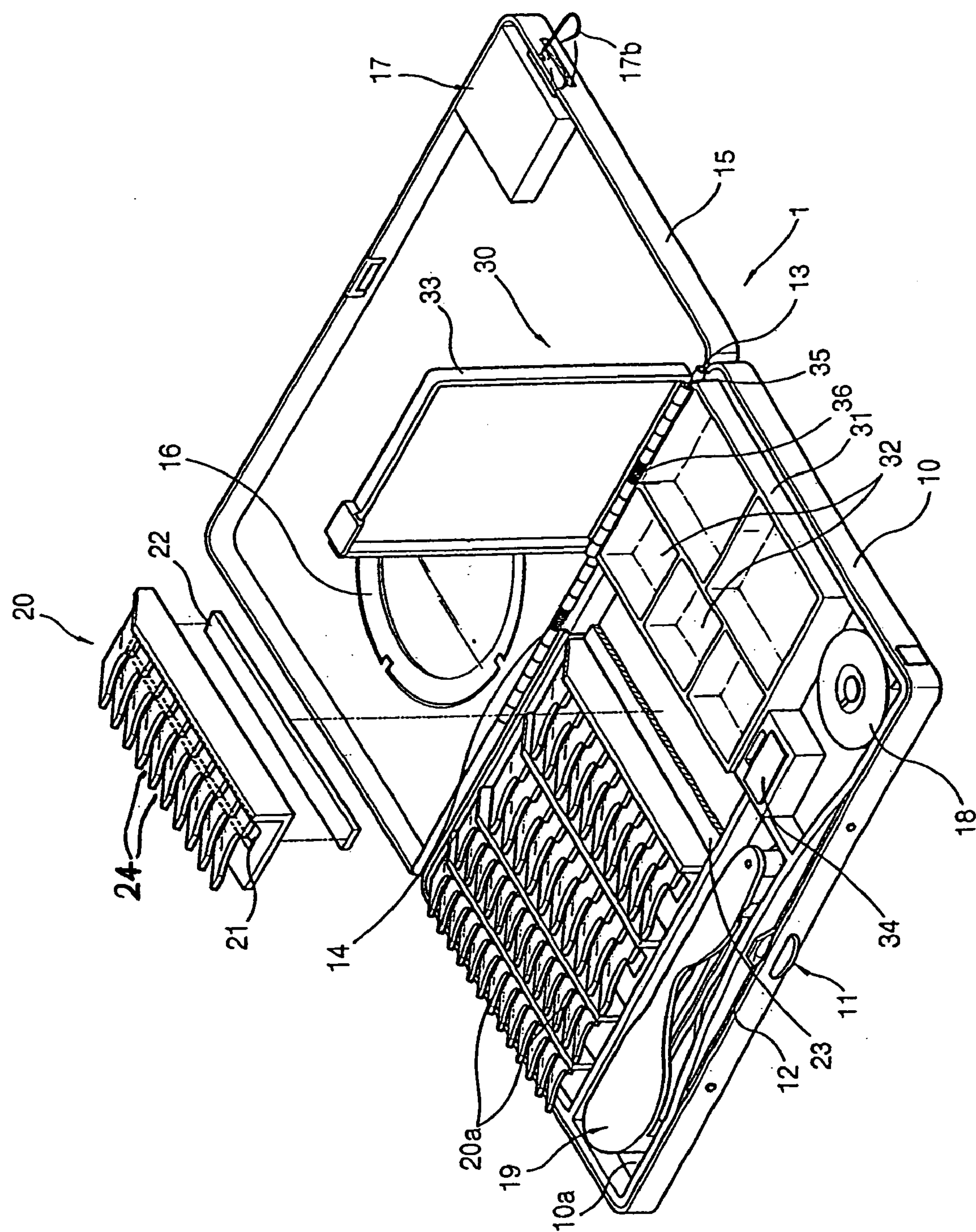
【FIG.1a】

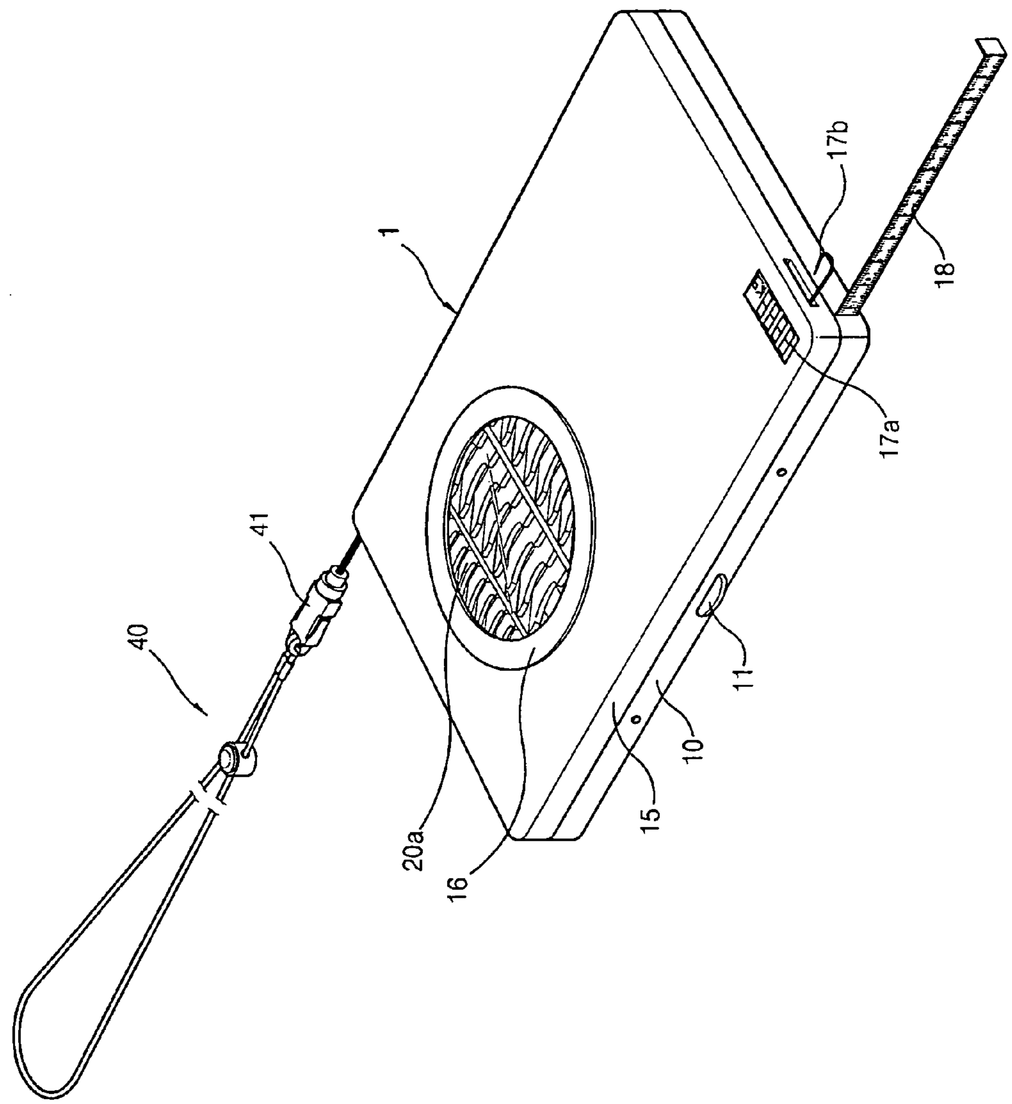
【FIG.1b】

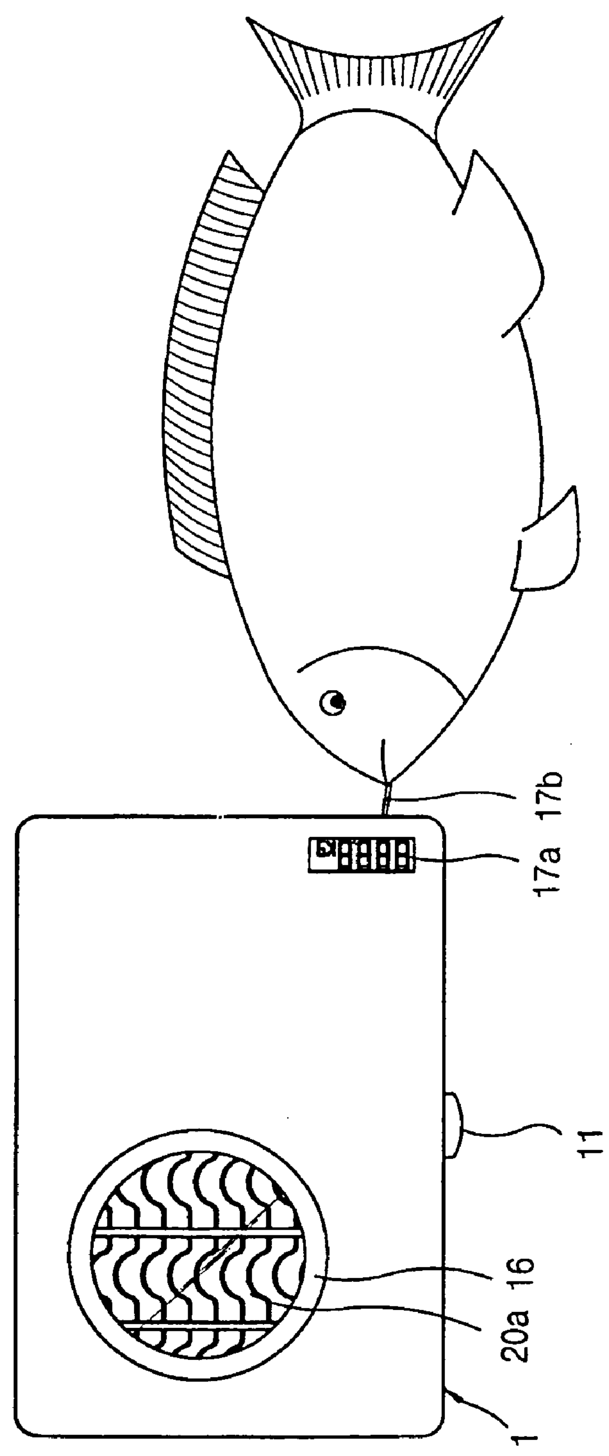
【FIG.1c】

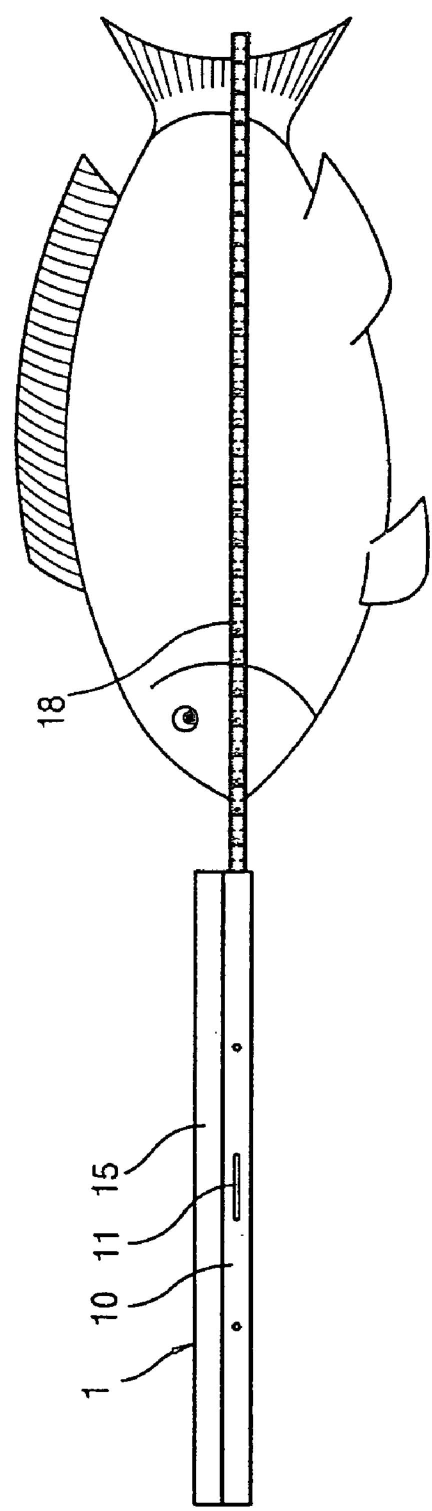
【FIG.1d】

【FIG.2a】
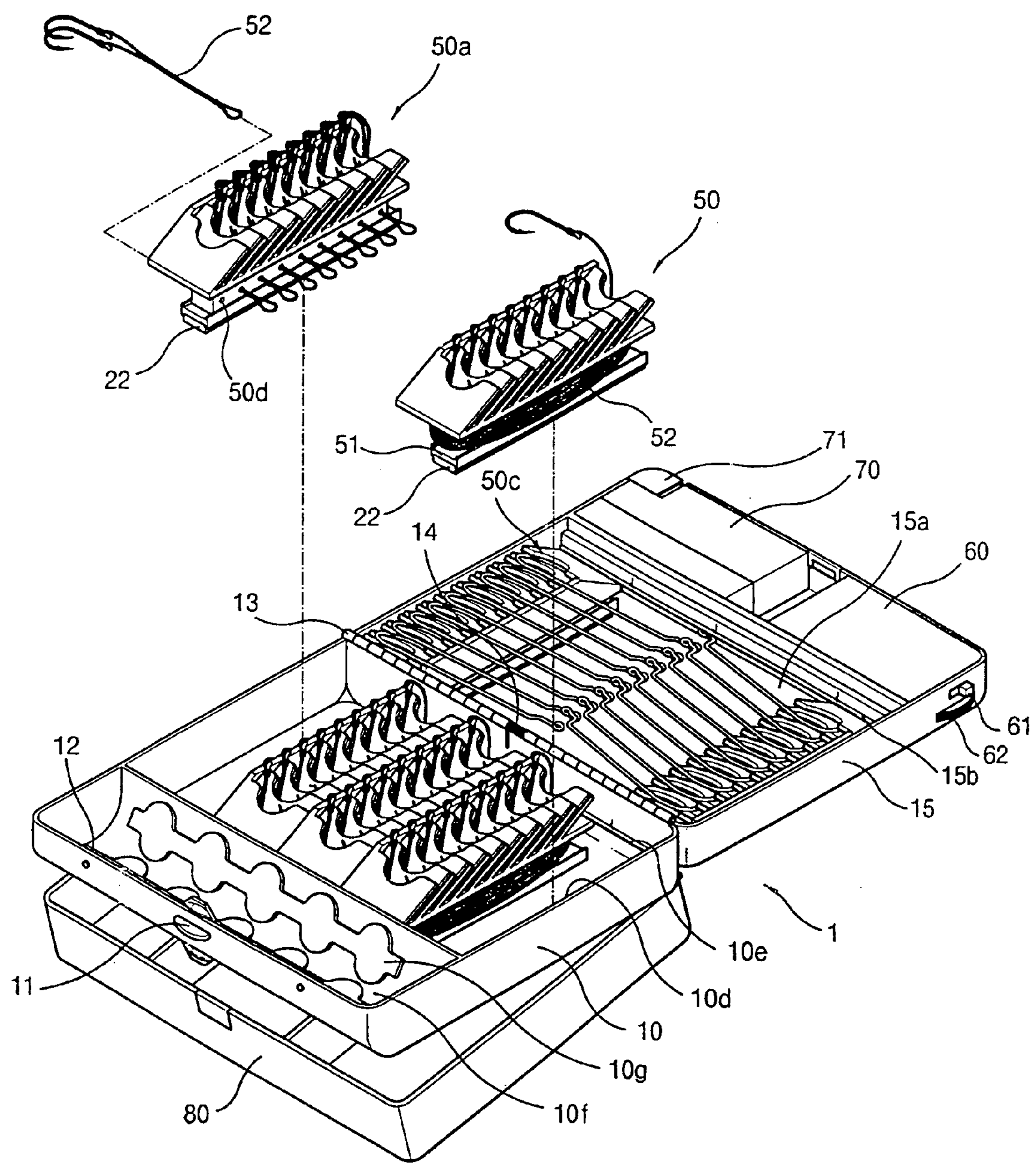

【FIG.2b】
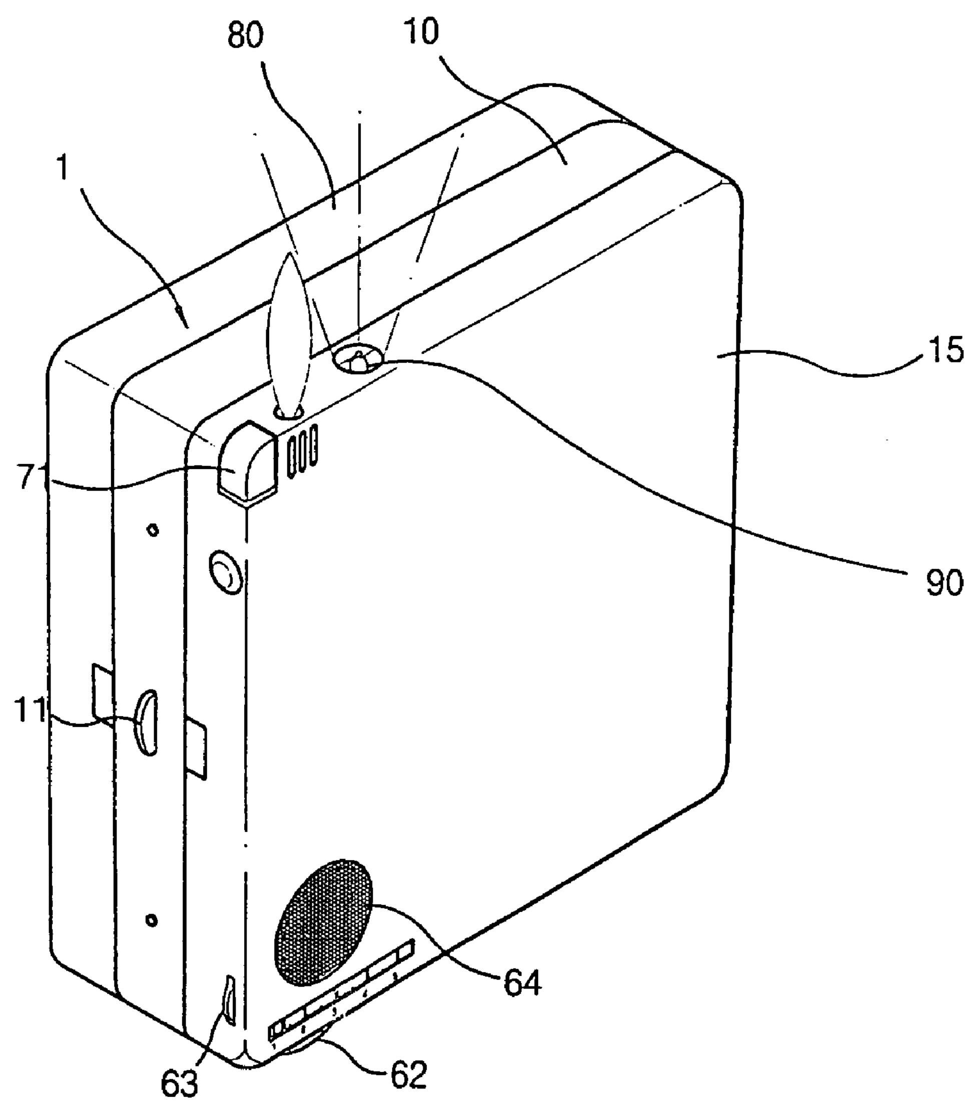

【FIG.3a】
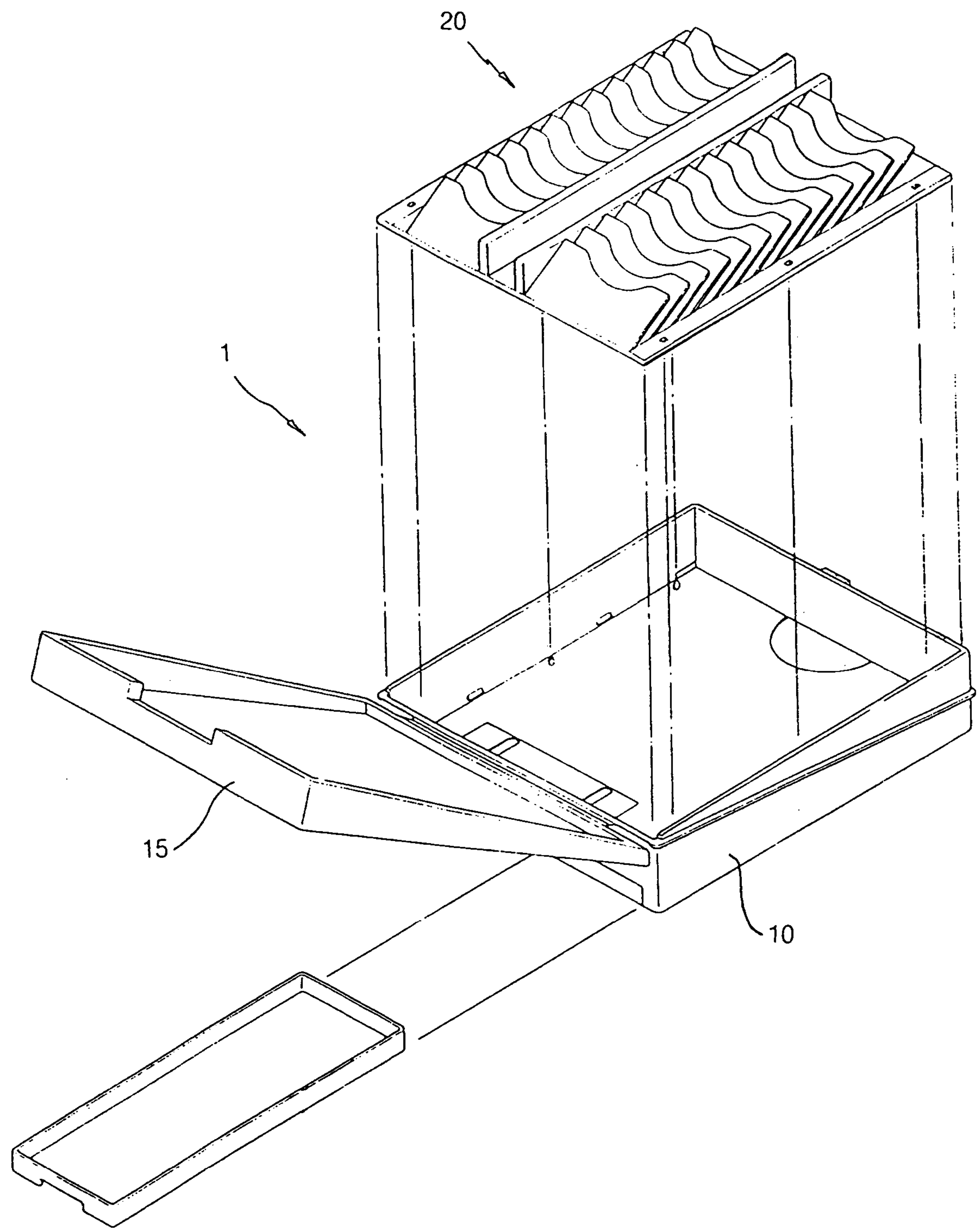

【FIG.3b】
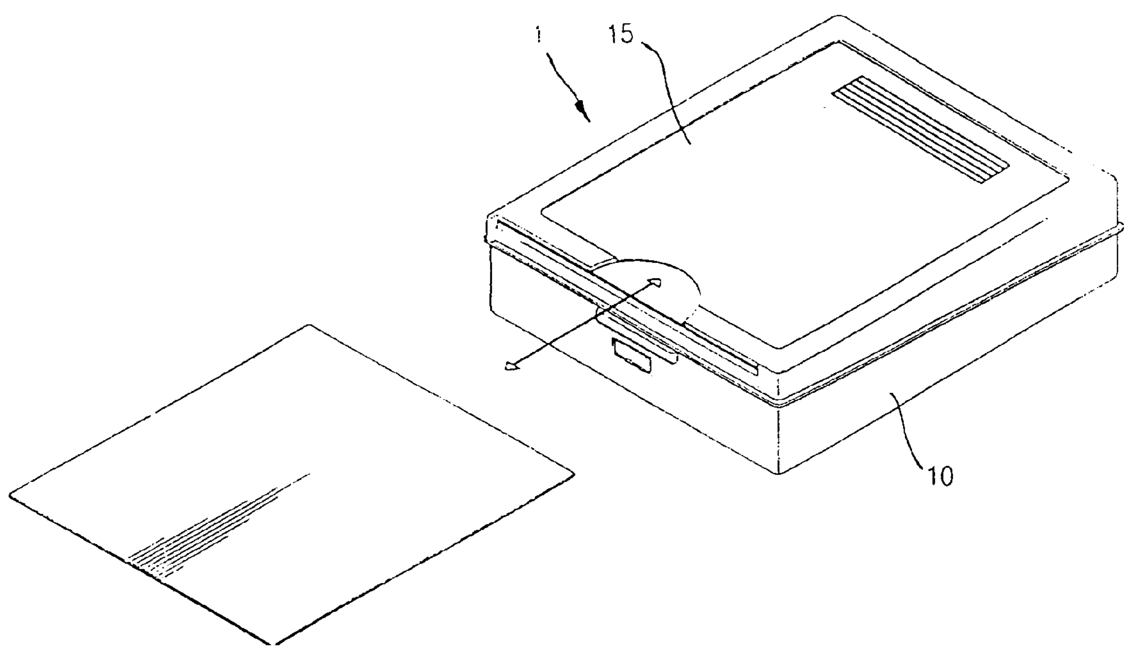

【FIG.3c】
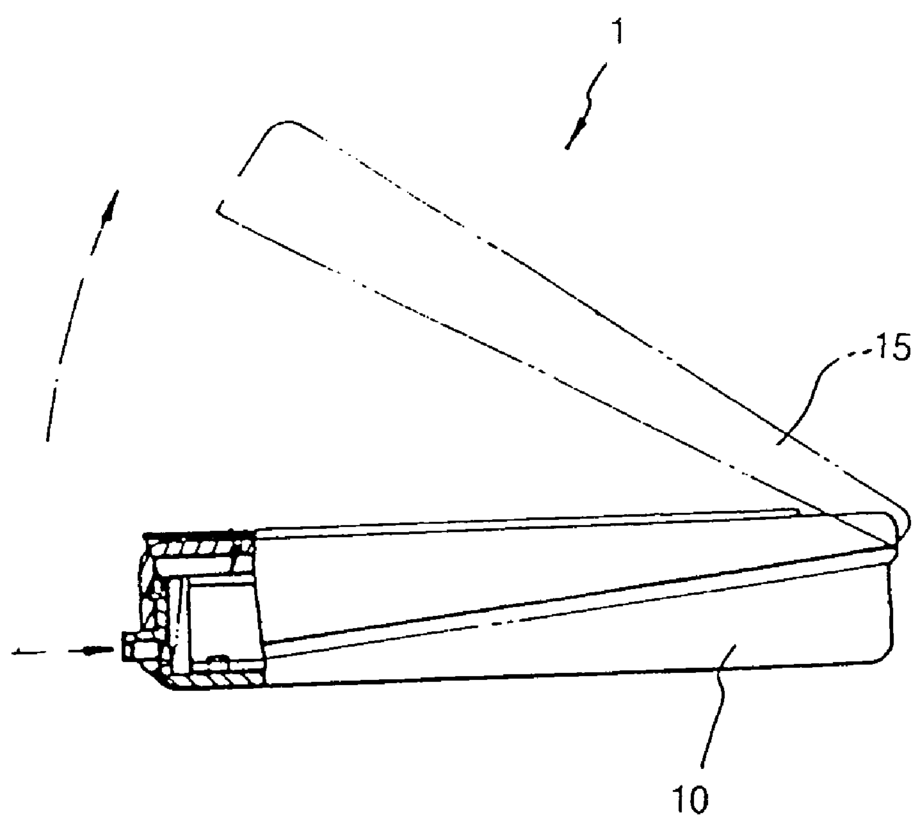

[FIG.4a]
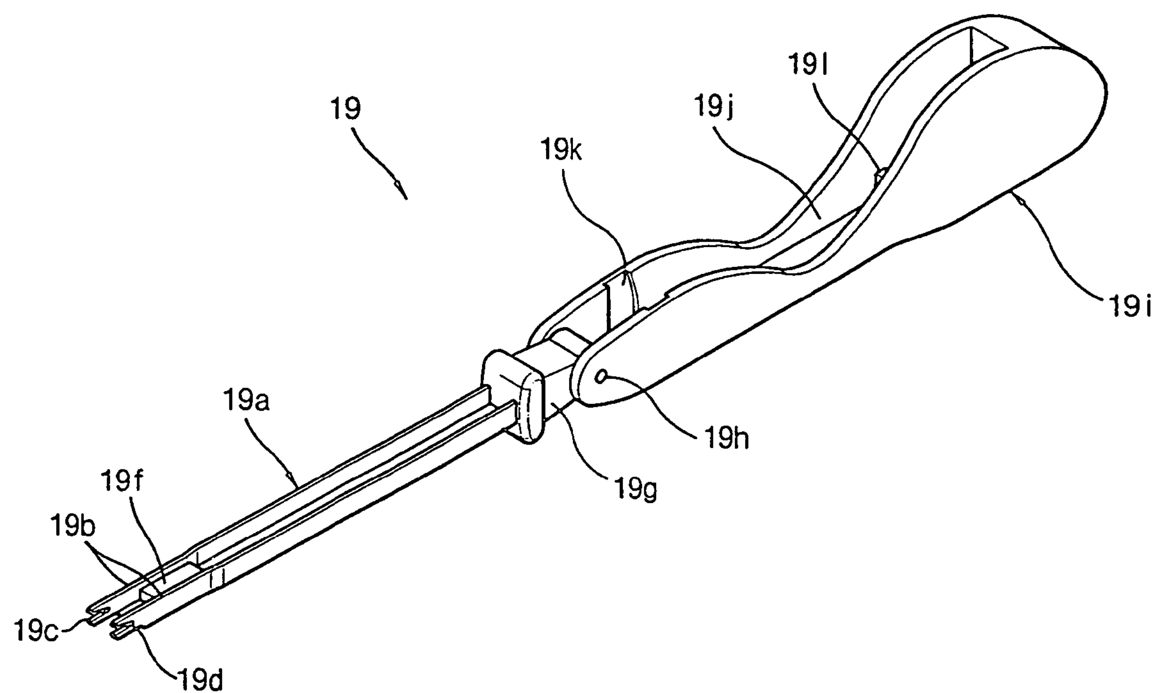
[FIG.4b]
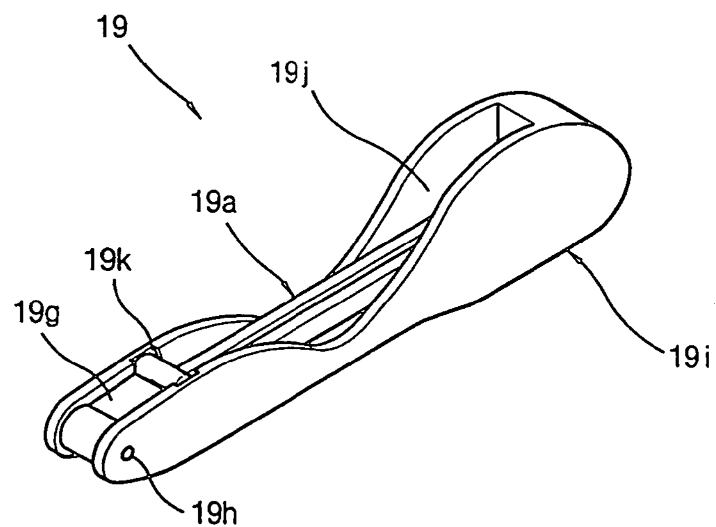

【FIG.4c】
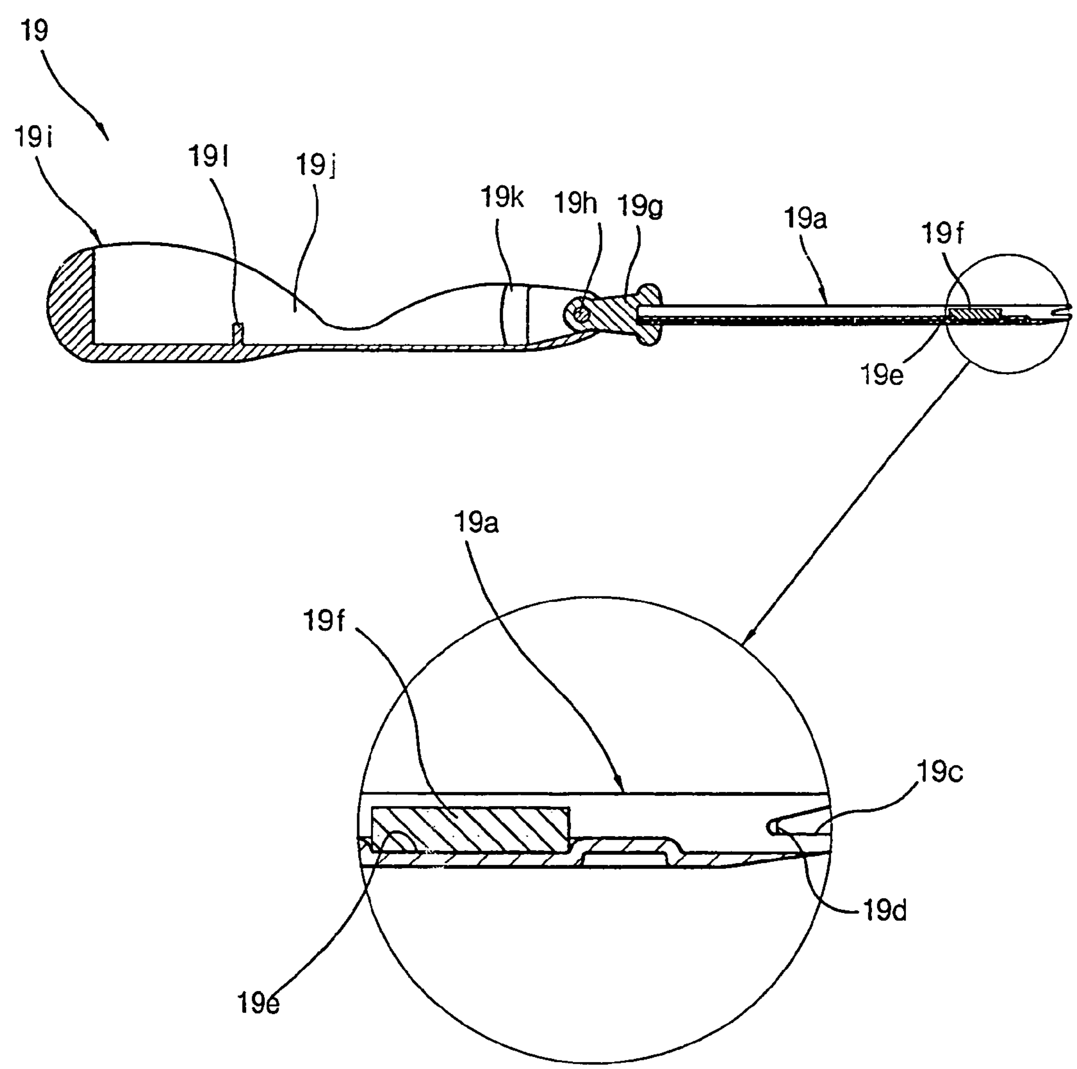

【FIG.5a】
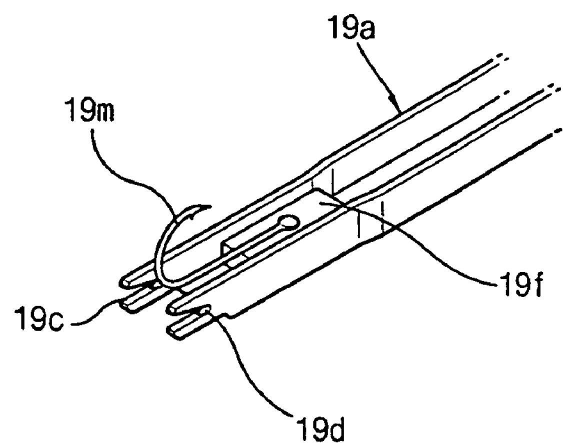
【FIG.5b】
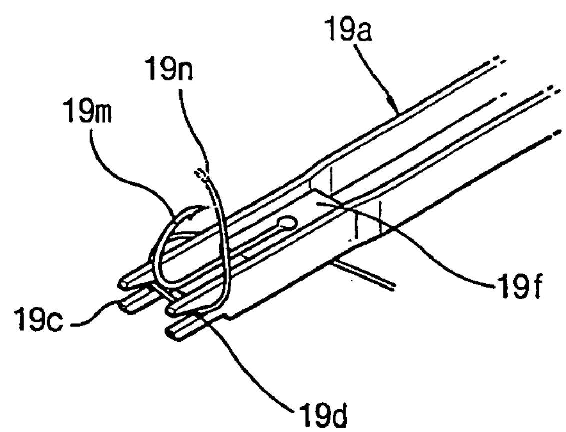

【FIG.5c】
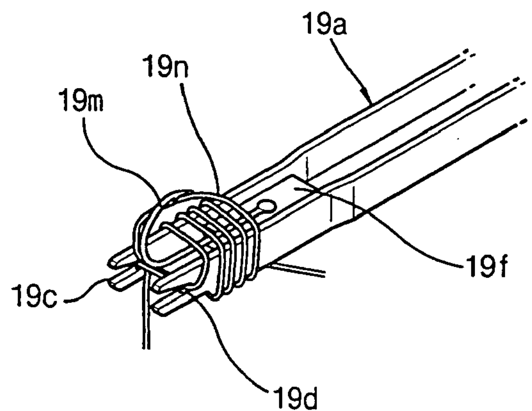
【FIG.5d】
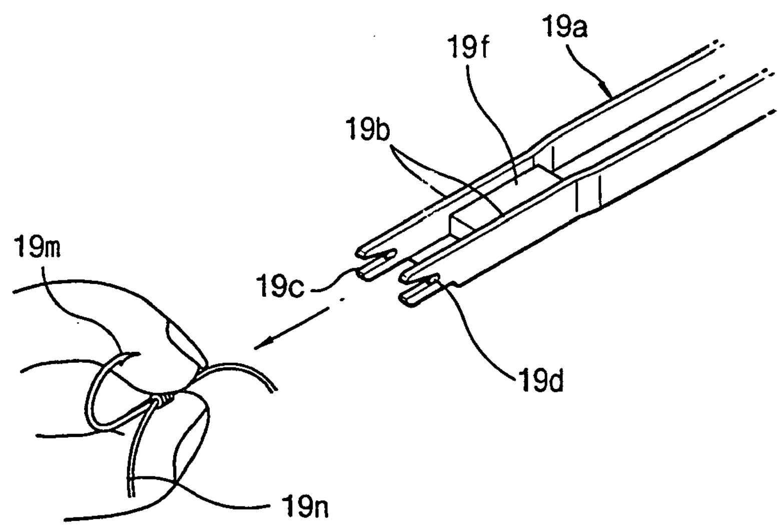

【FIG.6a】
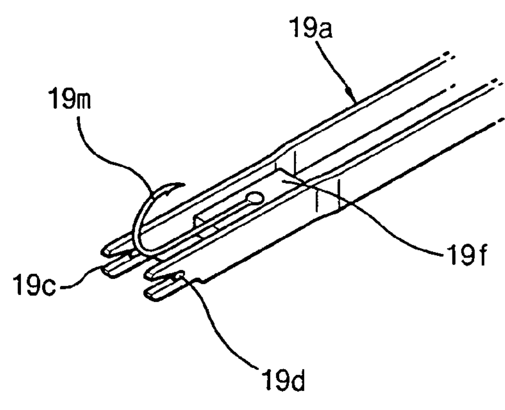
【FIG.6b】
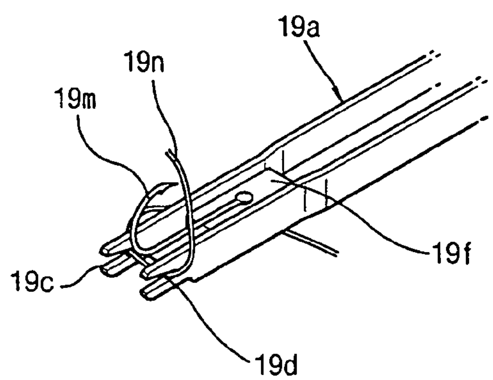
【FIG.6c】
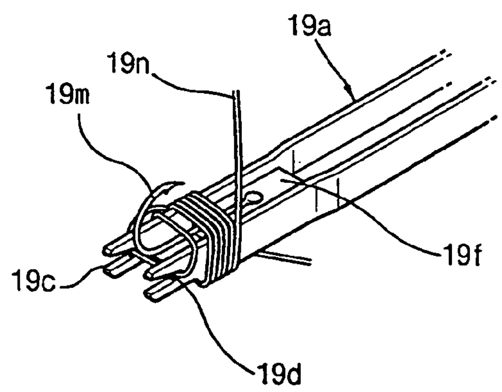

【FIG.6d】
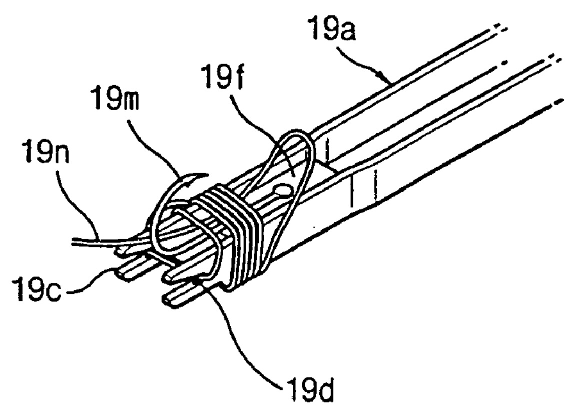
【FIG.6e】
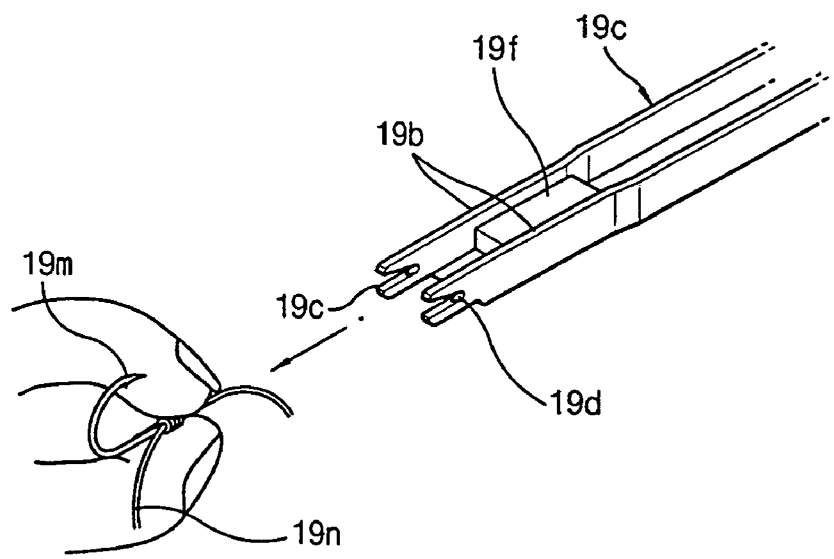

MULTI PURPOSE FISH-HOOK CASE INCLUDING FISHLINE BINDING DEVICE

TECHNICAL FIELD

The present invention relates, in general, to fish-hook cases used for keeping a variety of fish-hooks therein and, more particularly, to a multi purpose fish-hook case provided with a fishline binding device for allowing a user to more quickly and easily tie a fishline to a fish-hook, this fish-hook case being also designed to allow the user to easily and stably keep fish-hooks with or without fishlines in associated fish-hook containers, and being provided with a means for measuring the length and weight of a fish, and/or being provided with a radio, a gas lighter and/or a flashlight.

BACKGROUND ART

When it is desired to bind a fishline to a fish-hook, the end portion of the fishline is carefully passed through the eye of the fish-hook while being held by the fingers of a user prior to tightly knotting the fishline. However, such a fishline binding process is problematic in that it is very cumbersome to users and forces users to consume an excessive amount of time while binding fishlines to fish-hooks at night or by day having an abnormal change of temperature, or especially when the weather is cold.

In an effort to overcome such problems, a U-shaped fishline binding device, designed to allow a user to somewhat easily bind a fishline to a fish-hook, has been proposed and used. However, this conventional fishline binding device is problematic in that it forces a user to take a desired fish-hook out of a fish-hook container using the fingers at every fishline binding process and allows the fish-hook to move during a fishline binding process, which makes it difficult to tie a knot.

On the other hand, conventional fish-hook cases are only designed to receive and keep fish-hooks therein, but are not provided with a means for winding or keeping fishlines, a means for measuring the length or weight of the fish, and/or a structural means for providing a radio, a gas lighter and/or a flashlight to a user.

DISCLOSURE OF INVENTION

Accordingly, the present invention has been made keeping in mind the above problems occurring in the prior art, and an object of the present invention is to provide a multi purpose fish-hook case, which is provided with a fishline binding device for allowing a user to more quickly and easily tie a fishline to a selected fish-hook, and which is provided with a magnet on the fishline binding device for stably holding a selected fish-hook without allowing the fish-hook to undesirably move during a fishline binding process, and which has a cutting edge at the web of a fishline hook of the fishline binding device, thus allowing a user to easily, quickly and conveniently cut a fishline at a desired position when necessary.

Another object of the present invention is to provide a multi purpose fish-hook case with a fishline binding device, which is designed to allow a user to easily and stably keep a variety of fish-hooks with or without fishlines in associated fish-hook containers, which is provided with a measuring tape at a predetermined position for allowing a user to precisely measure the length of a fish at a fishing site, and which is provided with a weight measuring means at a predetermined position for allowing the user to precisely measure the weight of a fish at a fishing site, and which is provided with a radio, a gas lighter and a flashlight at predetermined positions, thus allowing the user to conveniently use them without carrying a separate radio, a separate gas lighter or a separate flashlight.

In order to accomplish the above object, the present invention provides a multi purpose fish-hook case used for keeping a variety of fish-hooks therein, comprising: a lid hinged to a main body and designed to be elastically openable around its hinged portion relative to the main body due to a spring force through a one-touch opening process when a first actuation button, provided at a predetermined position of a central portion of the main body, is pressed down, the lid also having a window at a predetermined position, thus allowing a user to see the contents of the main body; at least one fish-hook container attached to a steel plate, fixed to a predetermined position at a first side within the main body, due to its bottom magnet and designed to regularly and inclinedly receive a variety of fish-hooks therein; an accessory case fixed at a predetermined position at a second side within the main body, with a cover hinged to a top of the accessory case by a hinge and elastically openable around the hinge by a spring when a second actuation button is pressed down, the accessory case having a plurality of cells separately receiving a variety of fishing accessories therein; and a fishline binding device receiving cell formed at a predetermined position within the main body, with a fishline binding device used for tying a desired fishline to a desired fish-hook and received within the fishline binding device receiving cell.

BRIEF DESCRIPTION OF THE DRAWINGS

The above and other objects, features and other advantages of the present invention will be more clearly understood from the following detailed description taken in conjunction with the accompanying drawings, in which:

FIGS. 1*a* to 1*d* are views, showing the construction and operational effect of a multi purpose fish-hook case in accordance with the primary embodiment of the present invention;

FIGS. 2*a* and 2*b* are views, showing the construction and operational effect of a multi purpose fish-hook case in accordance with the second embodiment of the present invention;

FIGS. 3*a* to 3*c* are views, showing the construction and operational effect of a multi purpose fish-hook case in accordance with the third embodiment of the present invention;

FIGS. 4*a* to 4*c* are views of a fishline binding device included in a fish-hook case of this invention;

FIGS. 5*a* to 5*d* are views, showing one process of binding a fishline to a fish-hook using the fishline binding device of this invention; and FIGS. 6*a* to 6*e* are views, showing another process of binding a fishline to a fish-hook using the fishline binding device of this invention.

BEST MODE FOR CARRYING OUT THE INVENTION

FIGS. 1 to 6 show the construction and operational effect of the multi purpose fish-hook cases, individually having a fishline binding device, in accordance with the preferred embodiments of the present invention. In the drawings, the reference numeral 1 denotes a multi purpose fish-hook case for sea fishing according to this invention.

As shown in the drawings, the fish-hook case 1 of this invention, used for keeping a variety of fish-hooks therein, consists of a main body 10 provided with a lid 15. This lid 15 has a window 16 at a predetermined position, thus allowing a user to see the contents of the case 1. The above lid 15 is hinged to the back wall of the main body 10 using a spring-biased hinge 13, and so the lid 15 is elastically opened around the hinge 13 due to the restoring force of the spring 14 through a one-touch opening process when a user presses down a first actuation button 11, which is provided at a predetermined position of the central portion of the main body's front wall and is normally biased outwardly by a plate spring 12.

A steel plate 23 is fixed to a predetermined position at one side within the main body 10 of the case 1. One or more small-sized and large-sized fish-hook containers 20 and 20*a* are magnetically and removably attached to the top surface of the steel plate 23 due to their bottom magnets 22 and are designed to regularly and inclinedly receive a variety of fish-hooks within a plurality of inclined slides 24 serving as compartments for the fish-hooks. The above bottom magnets 22 are set in the longitudinal magnet seat slits 21 formed on the lower portion of the fish-hook containers 20 and 20*a*. The object of the attachment of the magnets 22 to the top surface of the steel plate 23 is to allow the isotropic permanent magnets 22 to be changed into anisotropic magnets free from damaging the magnetic tapes of a variety of magnetic cards, which may be received within pockets of a user's garment along with the fish-hook case 1 of this invention.

In the preferred embodiments of this invention, the fish-hook containers 20 and 20*a* are attached to the steel plate using the permanent magnets 22. However, it should be understood that rubber magnets or plastic magnets in place of such permanent magnets 22 may be used without affecting the functioning of this invention.

In addition, an accessory case 30 is fixed to the other side within the main body 10 of the fish-hook case 1, with a cover 33 hinged to the body 31 of the accessory case 30 by a hinge 35 and elastically opened by a spring 36 when the user operates a second actuation button 34. This accessory case 30 has a plurality of cells 32 separately receiving a variety of fishing accessories therein.

A fishline binding device receiving cell 10*a* is formed at a predetermined portion within the main body 10 and is used for receiving a fishline binding device 19 therein. The above device 19 is used for tying a desired fishline to a desired fish-hook, taken out of a fish-hook container 20 or 20*a*.

That is, the fishline binding device 19 is provided with a magnet and easily takes a desired fish-hook out of a fish-hook container 20 or 20*a* using the magnetic force of its magnet as will be described in detail later herein. The above device 19 is also provided with a cutting edge for cutting a fishline when necessary.

A weight measuring means 17 is provided at a predetermined position of the lid 15. This weight measuring means 17 comprises a hook 17*b* and a weight scale 17*a*, and so the scale 17*a* shows the weight of a fish when suspending the fish-hook case 1 with the fish in the air. Due to the above weight measuring means 17, the fish-hook case 1 of this invention allows a user to measure the weight of a fish when necessary.

In the drawings, the reference numeral 18 denotes a measuring tape, which is provided at a predetermined position of the main body 10 while being elastically wound within the main body 10 and is used for measuring the length of the fish.

A hanging loop 40, having a jack assembly 41 consisting of a male jack and a female jack, is connected to a predetermined position of the main body 10, thus allowing a user to easily carry the fish-hook case 1 of this invention without carelessly losing it.

The operational effect of the above fish-hook case 1 for sea fishing will be described herein below.

When it is desired to open the lid 15 of the case 1 the spring-biased first actuation button 11 is finger-pushed by a user. This action pushes the plate spring 12 into the interior of the main body 10, thus allowing the lid 15 to be rotated around the hinge 13 into an open position by the restoring force of the spring 14.

After opening the lid 15 as described above, the fishline binding device 19 is taken out of the cell 10*a* by a user. Thereafter, a desired fish-hook is magnetically taken out of a fish-hook container 20 or 20*a* using the device 19 prior to tying a fishline to the selected fish-hook. In such a case, a variety of large-scaled fish-hooks are neatly received within the cells of the large-scaled fish-hook container 20, while a variety of small-scaled fish-hooks are neatly received within the cells of the small-scaled fish-hook container 20. Due to such an arrangement of the fish-hook containers 20 and 20*a*, the fish-hook case 1 of this invention is very convenient to a user.

A magnet 22 is mounted to the lower portion of each of the fish-hook containers 20 and 20*a*, and so the containers 20 and 20*a* are magnetically attached to the steel plate 23 seated in the main body 10 at a position around the fishline binding device receiving cell 10*a*.

In the fish-hook case 1 of this invention the accessory case 30 is designed to receive a variety of fish-hooks and a variety of fishing accessories therein.

That is, the case body 31 of the accessory case 30 is partitioned into a plurality of cells 39, which separately and neatly receive a variety of desired fish-hooks and a variety of desired fishing accessories, such as blades, spinners and floats, therein. In the accessory case 30, the cover 33 is hinged to the case body 31 by the hinge 35 and is elastically rotated around the hinge 35 by the restoring force of the spring 36 into an open position when a user operates the second actuation button 34. When it is desired to close the cover 33 onto the case body 31, the cover 33 is fully rotated by a user into a close position until the close position of the cover 33 is completely caught by the second actuation button 34.

The window 16 is provided at a predetermined position of the lid 15, and so a user is allowed to see the contents of the case 1 from the outside of the lid 15.

In addition, the hanging loop 40, including the jack assembly 41 consisting of one male jack and one female jack, is connected to a predetermined position of the fish-hook case 1, thus allowing a user to hang the fish-hook case 1 around his neck while fishing and finally allowing the user to pay close attention to fishing without being afraid of carelessly losing the fish-hook case 1.

The fish-hook case of this invention allows a user to measure the weight of a fish at a fishing site. The process of measuring the weight of a fish is shown in FIG. 1*c*.

As shown in the drawing, a fish is primarily placed on the hook 17*b* of the weight measuring means 17 when it is desired to measure the weight of the fish.

Thereafter, the fish-hook case 1 with the fish is suspended in the air, and so the weight scale 17*a* shows the weight of the fish. Due to the above weight measuring means 17, the fish-hook case 1 of this invention allows a user to precisely measure the weight of a fish at a fishing site when necessary.

On the other hand, the fish-hook case of this invention allows a user to measure the length of a fish at a fishing site as shown in FIG. 1*d*. When it is desired to measure the length of a fish, the measuring tape 18 is extended from the interior of the main body 10 of the case 1 prior to precisely measuring the length of the fish using the extended measuring tape 18. Since the measuring tape 18 is normally biased by a spring to its fully wound position within the main body 10, the measuring tape 18 is automatically, elastically and fully retracted into the main body 10 when an external force is removed from the measuring tape 18 after a length measuring process.

FIGS. 2*a* and 2*b* are views, showing the construction and operational effect of a multi purpose fish-hook case for sea fishing or fresh-water fishing in accordance with the second embodiment of the present invention. In this embodiment, the fish-hook case is particularly designed to allow a user to tie a fishline to each fish-hook prior to arranging a plurality of fish-hooks in the cells of fish-hook containers within the case.

That is, in the fish-hook case of the second embodiment, a sub-seating cell 10*f* is provided at a predetermined position within the main body 10 of the case, with at least one rubber magnet 10*g* being set within the sub-seating cell 10*f*. A first seating area 10*d*, having a seating rib 10*e*, is provided at another predetermined position within the main body 10, with at least one sea fish-hook container 50 being seated in the first seating area 10*d*. The above fish-hook container 50 is provided with a sea fishline winding portion 51, around which a sea fishline 52 is wound. The above fish-hook container 50 is also provided with a magnet 22 at its lower portion. In such a case, the sea fishline 52, wound around the fish-hook container 50, preferably has a length of about 30 cm, but it should be understood that the length of the fishline 52 may be changed as desired.

A fresh-water fish-hook container 50*a* is removably seated in the first seating area 10*d* and is used for receiving a plurality of twin fish-hooks in its cells, with the twin fish-hooks being particularly designed to be used for fresh-water fishing. In the fresh-water fish-hook container 50*a*, the fishlines of the twin fish-hooks pass through fishline holes 50*d* so as to be kept in the container 50*a*.

In the drawings, the reference numeral 15 denotes a lid, which is provided with a second seating area 15*a* having a seating rib 15*b*. A fish-hook container 50*c*, used for receiving a plurality of large-scaled fish-hooks, is removably seated in the second seating area 15*a*.

An additional lower case 80 is hinged to a bottom edge of the main body 10, thus being selectively opened when necessary. This additional case 80 is partitioned into a plurality of cells used for separately receiving a variety of fishing accessories.

A radio 60, consisting of an on/off switch 61, a channel switch 62, a volume switch 63 and a speaker 64, is provided at a predetermined position of the lid 15. In addition, both a gas lighter 70 and a flashlight 90 are provided on the lid 15 of the fish-hook case 1 at predetermined positions. In order to allow a user to operate the lighter 70, an actuation button 71 is externally set on the lid 15. The remaining construction of the fish-hook case 1 except for the above-mentioned additional structures remains the same as that described for the primary embodiment.

The operational effect of the above fish-hook case 1 for sea or fresh-water fishing will be described herein below.

The process of opening or closing the lid 15 of the fish-hook case 1 according to the second embodiment remains the same as that described for the primary embodiment of this invention. However, in this fish-hook case 1, a sea fishline winding portion 51 is formed at the lower portion of the fish-hook container 50 and allows a user to easily keep the fishline 52, connected to each fish-hook received in the container 50 and having a length of 30 cm, while winding the fishlines 52 around the portion 51. On the other hand, a plurality of twin fish-hooks are kept in the cells of the fresh-water fish-hook container 50*a*, with the fishlines of the twin fish-hooks passing through the fishline holes 50*d* formed on the lower portion of a fresh-water fish-hook container 50*a*. Therefore, the fish-hook case 1 of this embodiment allows a user to easily and separately keep the sea and fresh-water fish-hooks in associated fish-hook containers of the case 1, thereby being convenient to the user while fishing.

In addition, a plurality of large-scaled fish-hooks are kept within the cells of the other fish-hook container 50*c*. The fish-hook containers 50 and 50*a* are removably seated on the seating rib 10*e* within the first seating area 10*d* of the main body 10, while the fish-hook container 50*c* is removably seated on the seating rib 15*b* within the second seating area 10*d* of the main body 10.

Each of the cells of the fish-hook container 50*a* is provided with a rubber magnet, and so the cells easily and stable hold the fish-hooks.

The additional lower case 80, hinged to a bottom edge of the main body 10 so as to be selectively opened when necessary, is partitioned into a plurality of cells, and separately receives a variety of fishing accessories, such as artificial baits (fly), within the cells.

In the fish-hook case 1, the lid 15 is provided with the radio 60 at a predetermined position. The on/off switch 61 operates this radio 60. In order ot allow a user to control the channel and volume of the radio 60, the radio 60 is provided with the channel switch 62 and the volume switch 63. The radio 60 also has the speaker 64, which outputs sound.

The fish-hook case 1 of this embodiment also has the gas lighter 70 at a predetermined position. The above lighter 70 is operated by the actuation button 71 and is used as an emergency lighter, and so it is very convenient to a user particularly when the user does not carry another lighter.

In addition, the flashlight 90 is provided on the lid 15 of the fish-hook case 1 at a predetermined position. This flashlight 90 is operated by an actuation button, which is provided at a predetermined position of the fish-hook case. The above flashlight 90 is used as an emergency flashlight, and improves the operational effect of the fish-hook case 1.

FIGS. 3*a* to 3*c* are views, showing the construction and operational effect of a multi purpose fish-hook case in accordance with the third embodiment of the present invention.

The fish-hook case 1 of this embodiment comprises a main body 10, with both a lid 15 hinged to a top edge of the main body 10 and a fish-hook container 20 removably seated within the main body 10.

The operational effect of the fish-hook case 1 of the third embodiment remains the same as that described for the primary and second embodiments.

However, this fish-hook case 1 is specifically designed to allow a user to separately keep a variety of fish-hooks, fishing accessories, fishline bobbins, nails, tokens and other personal necessaries in the main body 10, thus being more convenient to the user.

FIGS. 4*a* to 6*e* are views, showing the construction and operational effect of the fishline binding device 19 included in a fish-hook case of this invention. As shown in the drawings, the fishline binding device 19 of this invention, used for tying a fishline 19*n* to a selected fish-hook, comprises a longitudinal fishline binder 19*a* having a U-shaped cross-section. A fishline hook 19*c* is formed at the distal end of each pressure arm of the fishline binder 19*a*. The above fishline hook 19*c* is used for holding a fishline 19*n* during a process of tying a fishline to a selected fish-hook.

A fish-hook magnet 19*f*, used for magnetically holding a selected fish-hook 19*m*, is attached to a predetermined position of the distal end portion of the fishline binder 19*a*. In such a case, the fish-hook magnet 19*f* is seated in a depressed seat 19*e* formed at the distal end portion of the fishline binder 19*a*, with opposite sidewalls of the magnet 19*f* closely supported by the pressure arms 19*b* formed at the distal end of the fishline binder 19*a*. The fish-hook magnet 19*f* is thus stably and firmly held in its place on the fishline binder 19*a* without being undesirably removed from the fishline binder 19*a*.

A cutting edge 19*d*, used for cutting a fishline 19*n* as desired, is provided at the web of a fishline hook 19*c* of the fishline binder 19*a*.

In the drawings, the reference numeral 19*g* denotes a rotatable member, which is integrated with the inside end of the fishline binder 19*a*, with a hinge shaft 19*h* being set within the boss 19*g* at a predetermined position. The above hinge shaft 19*h* is rotatably held by opposite side support arms of a grip 19*i* at opposite ends thereof. The rotatable member 19*g*, integrated with the fishline binder 19*a*, is thus rotatable around the hinge shaft 19*h* when it is desired to open or close the fishline binder 19*a* relative to the grip 19*i*.

The above grip 19*i* has an axial channel 19*j* used for receiving both the fishline binder 19*a* and the rotatable member 19*g* therein when the binder 19*a* is fully closed. A specifically designed guide groove 19*k* is formed on the inside surface of each sidewall of the channel 19*j* at a position around the hinged shaft 19*h* so as to selectively hold the head of the rotatable member 19*g* when the binder 19*a* is fully closed within the channel 19*j*. On the other hand, a binder support 19*l*, used for horizontally supporting the fishline binder 19*a* closed within the channel 19*j*, is provided within the channel 19*j* at the outside end portion opposite to the fishline binder 19*a*.

The operational effect of the above fishline binding device 19 will be described herein below.

When it is desired to tie a fishline to a fish-hook, the fishline binder 19*a* is primarily and fully opened from the channel 19*j* of the grip 19*i* as shown in FIGS. 4*a* and 4*c*.

After the fishline binder 19*a* is fully opened from the channel 19*j* of the grip 19*i*, the fishline binder 19*a* is positioned close to a selected fish-hook 19*m* received within the fish-hook case 1. The selected fish-hook 19*m* is magnetically attracted by the magnet 19*f* provided at the fishline binder 19*a*, thus being taken out of the case 1 and being magnetically attached to the magnet 19*f* of the fishline binder 19*a* as shown in FIGS. 5*a* to 6*e*. Therefore, the fishline binding device of this invention allows a user to easily and magnetically take a selected fish-hook 19*m* out of the fish-hook case 1, thus being very convenient to the user during a process of binding a fishline to a fish-hook. When the selected fish-hook 19*m* is completely attached to the magnet 19*f* of the fishline binder 19*a*, the fishline 19*n* is primarily and horizontally hooked by the fishline hooks 19*c* as shown in FIG. 5*b* prior to being wound around the pressure arms of the fishline binder 19*a* at about five turns as shown in FIG. 5*c*.

Thereafter, the end of the fishline 19*n* passes behind the fishline 19*n* extending between the two fishline hooks 19*c*. The fishline 19*n*, wound around the pressure arms of the fishline binder 19*a* at about five turns, is pulled outwardly from the pressure arms of the fishline binder 19*a* by a user, with the fingers of the user holding the five turns of the fishline around the pressure arms. Therefore, the fishline 19*n* is removed from the fishline binder 19*a* along with the fish-hook 19*m* as shown in FIG. 5*d* while being closely tied to a desired portion of the shank of the fish-hook 19*m*. The fishline binding device 19 of this invention allows a user to easily, quickly and conveniently tie a fishline to a selected fish-hook.

In addition to the process of binding a fishline 19*n* to a selected fish-hook 19*m* using the fishline binding device 19 as shown in FIGS. 5*a* to 5*d*, the present invention also provides another process of binding a fishline to a fish-hook using the fishline binding device as shown in FIGS. 6*a* to 6*e*.

When it is desired to bind a fishline 19*n* to a fish-hook 19*m* using the fishline binding process of FIGS. 6*a* to 6*e*, the fishline 19*n* is wound around the pressure arms of the fishline binder 19*a* as shown in FIGS. 6*a* and 6*b*. After the fishline winding step, the end of the fishline 19*n* passes under the turns of the fishline 19*n* wound around the pressure arms of the fishline binder 19*a* until the end of the fishline 19*n* is completely led to the outside of the fishline binder 19*a*. In this process, the other steps of binding the fishline 19*n* to the fish-hook 19*m* remain the same as those described for the process of FIGS. 5*a* to 5*d*. The fishline binding device 19 of this invention thus allows a user to easily, quickly and conveniently tie a fishline 19*n* to a selected fish-hook 19*m*.

After the fishline 19*n* is tied to the fish-hook 19*m* as described above, it is necessary to cut the fishline 19*n* at a desired position. When it is desired to cut a fishline 19*n*, the cutting edge 19*d*, provided at the web of a fishline hook 19*c* of the fishline binder 19*a*, is positioned around the desired position of the fishline 19*n* prior to pulling the fishline 19*n*. When the fishline 19*n* is pulled by a user as described above, the fishline 19*n* is cut at the desired position by the cutting edge 19*d*, and so the fishline binding device 19 of this invention allows a user to cut the fishline 19*n* without using a separate cutting means.

After a fishline binding process using the binding device 19, the fishline binder 19*a* is closed into the channel 19*j* of the grip 19*i*.

In order to close the fishline binder 19*a* into the channel 19*j* of the grip 19*i*, the binder 19*a* is rotated around the hinge shaft 19*h* of the rotatable member 19*g* integrated with the binder 19*a*. In such a case, the guide grooves 19*k*, formed on the sidewalls of the channel 19*j*, hold the head of the rotatable member 19*g*, while the binder support 19*l* horizontally supports the fishline binder 19*a* closed within the channel 19*j*.

When it is desired to tie a fishline to a fish-hook using the fishline binding device 19, the fishline binder of the device is opened from the channel of the grip and ties the fishline 19*n* to the fish-hook 19*m*. The fishline binding device of this invention thus allows a user to easily, quickly and conveniently tie a fishline to a fish-hook while fishing.

INDUSTRIAL APPLICABILITY

As described above, the present invention provides a multi purpose fish-hook case provided with a fishline binding device for allowing a user to more quickly and easily tie a fishline to a fish-hook. This fish-hook case is also designed to allow the user to easily and stably keep fish-hooks with or without fishlines in associated fish-hook containers. The fish-hook case of this invention is provided with a means for measuring the length and weight of a fish, and/or has a radio, a gas lighter and/or a flashlight.

What is claimed is:

1. A multi purpose fish-hook case used for keeping a variety of fish-hooks therein, comprising:

a lid hinged to a main body and rotating on its hinge relative to the main body due to a spring providing force opening the lid responsive to a one-touch opening process when a first actuation button provided at a predetermined position of a central portion of said main body is pressed down, said lid also having a window at a predetermined position, thus allowing a user to see the contents of the main body;

at least one fish-hook container attached to a steel plate, fixed to a predetermined position at a first side within the main body, said at least one fish-hook container having a bottom magnet and a plurality of inclined slides designed to regularly and inclinedly receive a variety of fish-hooks therein;

an accessory case fixed at a predetermined position at a second side within the main body, with a cover hinged to a top of said accessory case by a hinge and elastically openable around the hinge by a spring when a second actuation button is pressed down, said accessory case having a plurality of cells separately receiving a variety of fishing accessories therein; and a fishline binding device receiving cell formed at a predetermined position within the main body, with a fishline binding device used for tying a desired fishline to a desired fish-hook and received within said fishline binding device receiving cell.

2. The multi purpose fish-hook case according to claim 1, further comprising weight measuring means for measuring the weight of a fish, said weight measuring means being provided at a predetermined position of said lid and consisting of a hook and a weight scale, said weight scale showing the weight of a fish when suspending the fish-hook case with the fish held on the hook in the air.

3. The multi purpose fish-hook case according to claim 1, further comprising a measuring tape provided at a predetermined position of said main body for measuring the length of a fish.

4. The multi purpose fish-hook case according to claim 1, further comprising a hanging loop connected to a predetermined position of said main body, said hanging loop having a jack assembly, consisting of a male jack and a female jack, and allowing a user to easily carry the fish-hook case without carelessly losing the case.

5. The multi purpose fish-hook case according to claim 1, wherein said bottom magnet is positioned at a lower portion of said fish-hook container for inclinedly maintaining a fish-hook within said fish-hook container.

6. A multi purpose fish-hook case used for keeping a variety of fish-hooks therein, comprising:

a lid hinged to a main body and designed to be elastically openable around its hinged portion relative to the main body due to a spring force through a one-touch opening process when a first actuation button, provided at a predetermined position of a central portion of said main body, is pressed down, said lid also having a window at a predetermined position, thus allowing a user to see the contents of the main body;

at least one fish-hook container attached to a steel plate, fixed to a predetermined position at a first side within the main body, said at least one fish-hook container having a bottom magnet designed to regularly and inclinedly receive a variety of fish-hooks therein;

an accessory case fixed at a predetermined position at a second side within the main body, with a cover hinged to a top of said accessory case by a hinge and elastically openable around the hinge by a spring when a second actuation button is pressed down, said accessory case having a plurality of cells separately receiving a variety of fishing accessories therein; and a fishline binding device receiving cell formed at a predetermined position within the main body, with a fishline binding device used for tying a desired fishline to a desired fish-hook and received within said fishline binding device receiving cell, said fishline binding device having a fish-hook magnet attached to a predetermined position of a distal end portion of a fishline binder of said fishline binding device and used for magnetically holding a selected fish-hook on the fishline binder;

a depressed seat formed at the distal end portion of the fishline binder and used for seating said fish-hook magnet therein without allowing the fish-hook magnet to be undesirably removed from the fishline binder, with opposite sidewalls of the fish-hook magnet being closely supported by two pressure arms formed at the distal end portion of the fishline binder;

a cutting edge provided at a web of a fishline hook of said fishline binder and used for cutting a fishline at a desired position;

a rotatable member integrated with an end of the fishline binder; and a grip having an axial channel used for receiving both the fishline binder and the rotatable member therein when the fishline binder is fully closed relative to the grip, with a hinge shaft of the rotatable member being rotatably held by opposite sidewalls of the grip, a guide groove being formed on the inside surface of each sidewall of said channel at a position around the hinge shaft so as to selectively hold a head of said rotatable member when the fishline binder is fully closed within the channel, and a binder support being provided within the channel at an outside end portion opposite to the fishline binder and being used for horizontally supporting the fishline binder closed within the channel of the grip.

7. A multi purpose fish-hook case used for keeping a variety of fish-hooks therein, comprising:

a lid hinged to a main body and designed to be elastically openable around its hinged portion relative to the main body due to a spring force through a one-touch opening process when a first actuation button, provided at a predetermined position of a central portion of said main body, is pressed down, said lid also having a window at a predetermined position, thus allowing a user to see the contents of the main body;

at least one fish-hook container attached to a steel plate, fixed to a predetermined position at a first side within the main body, said at least one fish-hook container having a bottom magnet and designed to regularly and inclinedly receive a variety of fish-hooks therein;

an accessory case fixed at a predetermined position at a second side within the main body, with a cover hinged to a top of said accessory case by a hinge and elastically openable around the hinge by a spring when a second actuation button is pressed down, said accessory case having a plurality of cells separately receiving a variety of fishing accessories therein; and a fishline binding device receiving cell formed at a predetermined position within the main body, with a fishline binding device used for tying a desired fishline to a desired fish-hook and received within said fishline binding device receiving cell;

a sub-seating cell provided at a predetermined position within the main body for receiving a variety of fishing accessories therein, with at least one rubber magnet being set within said sub-seating cell for holding the fishing accessories within the sub-seating cell;

a first seating area having a seating rib and provided at another predetermined position within the main body, with at least one sea fish-hook container being seated in the first seating area, said sea fish-hook container being provided with a sea fishline winding portion, around which a sea fishline is wound, said sea fish-hook container being also provided with a magnet at its lower portion;

a fresh-water fish-hook container removably seated in said first seating area and used for receiving a plurality of fresh-water fish-hooks in its cells, with fishlines of the fresh-water fish-hooks passing through fishline holes so as to be kept in the fresh-water fish-hook container;

a second seating area having a seating rib and provided on the lid at a predetermined position, with another fish-hook container removably seated in the second seating area and used for receiving a plurality of large-scaled fish-hooks in its cells; and an additional lower case hinged to a bottom edge of said main body so as to be selectively opened as desired, said additional lower case being partitioned into a plurality of cells used for separately receiving a variety of fishing accessories therein.

8. The multi purpose fish-hook case according to claim 7, wherein a radio, consisting of an on/off switch, a channel switch and volume switch, is provided at a predetermined position of said lid.

9. The multi purpose fish-hook case according to claim 7, wherein a lighter is provided on the lid at a predetermined position.

10. The multi purpose fish-hook case according to claim 7, wherein a flashlight is provided on the lid at a predetermined position.

* * * * *